United States Patent
Li et al.

(10) Patent No.: US 10,275,064 B2
(45) Date of Patent: Apr. 30, 2019

(54) IN CELL TOUCH DISPLAY DEVICE AND COMMON VOLTAGE GENERATING METHOD THEREOF

(71) Applicant: Chunghwa Picture Tubes, LTD., Taoyuan (TW)

(72) Inventors: Yu-Chen Li, Taoyuan (TW); Chao-Yung Hsu, Taoyuan (TW); Hung-Hsiang Chen, Taoyuan (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 0 days.

(21) Appl. No.: 15/721,962

(22) Filed: Oct. 2, 2017

(65) Prior Publication Data

US 2019/0050093 A1    Feb. 14, 2019

(30) Foreign Application Priority Data

Aug. 14, 2017 (CN) .......................... 2017 1 0690538

(51) Int. Cl.
   *G06F 3/041* (2006.01)
   *G06F 3/044* (2006.01)
(52) U.S. Cl.
   CPC .......... *G06F 3/0412* (2013.01); *G06F 3/0416* (2013.01); *G06F 3/044* (2013.01); *G09G 2310/08* (2013.01)

(58) Field of Classification Search
   None
   See application file for complete search history.

(56) References Cited

U.S. PATENT DOCUMENTS 9,223,425 B1 * 12/2015 Kim ..................... G06F 3/0412

FOREIGN PATENT DOCUMENTS

| CN | 106406609 | 2/2017 |
| TW | I537794 | 6/2016 |

* cited by examiner

*Primary Examiner* — Christopher J Kohlman
(74) *Attorney, Agent, or Firm* — JCIPRNET

(57) ABSTRACT

The invention provides an in cell touch display device and a common voltage generating method thereof. The in cell touch display device includes a timing controller and a common voltage generator. The timing controller generates a control signal, divides a time section into a display scanning time section and a touch scanning time section according to the control signal, and divides the touch scanning time section into a touch start time section, a touch execution time section, and a touch end time section sequentially. The common voltage generator raises a common voltage to a first voltage in the touch start time section, provides a periodical pulse signal in the touch execution time section to generate the common voltage, and lowers the common voltage to a second voltage in the touch end time section, so as to improve the efficiency of touch scanning without affecting the efficiency of display scanning.

18 Claims, 7 Drawing Sheets

IN CELL TOUCH DISPLAY DEVICE AND COMMON VOLTAGE GENERATING METHOD THEREOF

CROSS-REFERENCE TO RELATED APPLICATION

This application claims the priority benefit of China application serial no. 201710690538.3, filed on Aug. 14, 2017. The entirety of the above-mentioned patent application is hereby incorporated by reference herein and made a part of this specification.

BACKGROUND OF THE INVENTION

Field of the Invention

The invention relates to an in cell touch display device and particularly relates to a common voltage generating method of the in cell touch display device.

Description of Related Art

In cell touch display device is the goal that panel manufacturers in the field of touch products have been trying to reach in recent years. The layered structure design that directly embeds the touch detector in the display panel enables the in cell touch display device to integrate image display and touch detection and provides a product type that is more competitive.

Under the condition that the display device and the touch device are integrated with each other, the display scanning operation and the touch detection scanning operation need to be performed separately, so as to prevent mutual interference. However, in the in cell touch display device, the same common voltage is used when the display scanning operation and the touch detection scanning operation are performed. In the process of switching between the display scanning operation and the touch detection scanning operation, the common voltage needs to be adjusted corresponding to the scanning operation that is to be performed. Due to influence of the parasitic capacitance and resistance value inside the in cell touch display device, a certain settling time is needed for switching the common voltage to the required voltage value. Hence, as the panel resolution increases, the settling time may cause the effect of at least one of the touch detection and image display to be affected and impair the performance.

SUMMARY OF THE INVENTION

The invention provides an in cell touch display device and a common voltage generating method thereof for quickly providing a stable common voltage and improving the efficiency of touch scanning without affecting the efficiency of display scanning.

The in cell touch display device of the invention includes a timing controller and a common voltage generator. The timing controller generates a control signal, divides a time section into a display scanning time section and a touch scanning time section according to the control signal, and divides the touch scanning time section into a touch start time section, a touch execution time section, and a touch end time section sequentially. The common voltage generator raises a common voltage to a first voltage in the touch start time section, provides a periodical pulse signal in the touch execution time section to generate the common voltage, and lowers the common voltage to a second voltage in the touch end time section. The pulse signal oscillates between a third voltage and a fourth voltage. The first voltage is not smaller than the third voltage, the second voltage is not greater than the third voltage, and the third voltage is smaller than the fourth voltage.

The common voltage generating method of the invention is adapted for the in cell touch display device. The common voltage generating method includes: generating a control signal, dividing a time section into a display scanning time section and a touch scanning time section according to the control signal, and dividing the touch scanning time section into a touch start time section, a touch execution time section, and a touch end time section sequentially; and raising a common voltage to a first voltage in the touch start time section, providing a periodical pulse signal in the touch execution time section to generate the common voltage, and lowering the common voltage to a second voltage in the touch end time section. The pulse signal oscillates between a third voltage and a fourth voltage. The first voltage is not smaller than the third voltage, the second voltage is not greater than the third voltage, and the third voltage is smaller than the fourth voltage.

Based on the above, the invention provides a method for quickly setting the common voltage and makes it possible to set the common voltage to the required voltage levels quickly in the touch start time section and the touch end time section to reduce the settling time for the common voltage, by which the efficiency of touch detection is improved without compromising the display quality.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
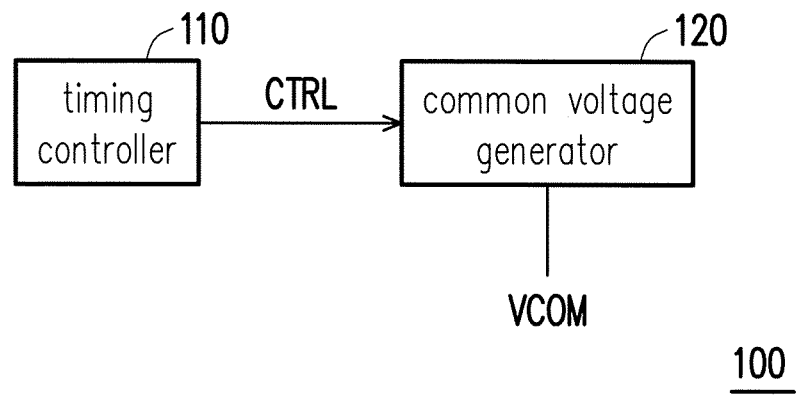
FIG. 1 is a schematic diagram of the in cell touch display device according to an embodiment of the invention.

Referring to FIG. 1, FIG. 1 is a schematic diagram of an in cell touch display device according to an embodiment of the invention. The in cell touch display device 100 includes a timing controller 110 and a common voltage generator 120. The timing controller 110 and the common voltage generator 120 are coupled to each other, wherein the timing controller 110 generates a control signal CTRL, divides a time section into a display scanning time section and a touch scanning time section according to the control signal CTRL, and divides the touch scanning time section into a touch start time section, a touch execution time section, and a touch end time section sequentially. The common voltage generator 120 receives the control signal CTRL, and according to the control signal CTRL, raises a common voltage VCOM to a first voltage in the touch start time section, provides a periodical pulse signal in the touch execution time section to generate the common voltage VCOM, and lowers the common voltage VCOM to a second voltage in the touch end time section. The pulse signal is a periodical signal that oscillates between a third voltage and a fourth voltage, wherein the first voltage is not smaller than the third voltage, the second voltage is not greater than the third voltage, and the third voltage is smaller than the fourth voltage.

The common voltage VCOM generated by the common voltage generator 120 is provided onto a touch display panel (not shown) of the in cell touch display device 100. Operations of image display and touch detection are executed in the display scanning time section and the touch scanning time section respectively.

Figure 2:
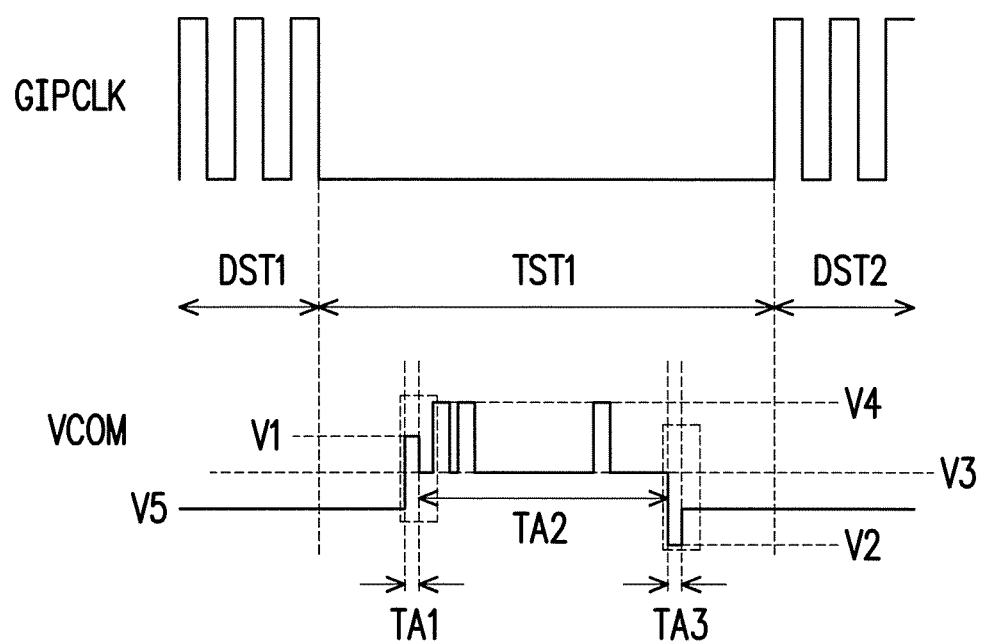
FIG. 2 is a waveform diagram of an embodiment of a common voltage generating method for the in cell touch display device of the embodiment of the invention.

Regarding details of implementation of the embodiment of the invention, please refer to FIG. 1 and FIG. 2, wherein FIG. 2 is a waveform diagram of an embodiment of a common voltage generating method for the in cell touch display device of the embodiment of the invention. First, the timing controller 110 may divide a time section into a display scanning time section DST1 and a touch scanning time section TST1. In the display scanning time section DST1, a display scanning operation is performed according to a gate clock signal GIPCLK that transits continuously. Moreover, in the touch scanning time section TST1, the gate clock signal GIPCLK stops transiting and the display scanning operation is stopped. In the meantime, the in cell touch display device 100 performs a touch scanning operation for touch detection.

In addition, the timing controller 110 generates the control signal CTRL, so as to divide a touch start time section TA1, a touch execution time section TA2, and a touch end time section TA3 that sequentially take place in the touch scanning time section TST1. According to the control signal CTRL, the common voltage generator 120 raises the common voltage VCOM in the touch start time section TA1 to raise the common voltage VCOM from a fifth voltage V5 to a first voltage V1, so as to quickly raise the voltage value of the common voltage VCOM and reduce a rise time required for the common voltage VCOM. Then, in the touch execution time section TA2, the common voltage generator 120 makes the common voltage VCOM become a periodical pulse signal that transits between a third voltage V3 and a fourth voltage V4 according to the control signal CTRL. According to the periodical pulse on the common voltage VCOM in the touch execution time section TA2, a plurality of touch plates on the touch display panel may be scanned to complete an operation of touch point report.

Next, after the touch execution time section TA2 ends, the common voltage generator 120 quickly lowers the common voltage VCOM from the third voltage V3 to the second voltage V2 in the touch end time section TA3 according to the control signal CTRL, so as to reduce the time for the common voltage VCOM to drop. After the touch end time section TA3 ends, the common voltage VCOM recovers and becomes equal to the fifth voltage V5, and enters the following display scanning time section DST2.

It should be noted that, when the in cell touch display device 100 is in the display scanning time sections DST1 and DST2, the voltage value of the common voltage VCOM is set to the fixed fifth voltage V5. In this embodiment, the fifth voltage V5 may be a voltage smaller than 0V, e.g., equal to −2V. When the in cell touch display device 100 enters the touch scanning time section TST1, in order to quickly raise the voltage value of the common voltage VCOM, the common voltage generator 120 provides the first voltage V1 that is greater than the third voltage V3 in the touch start time section TA1, so as to raise the voltage value of the common voltage VCOM. Based on that the first voltage V1 is greater than the third voltage V3, the common voltage VCOM is quickly raised to be greater than the third voltage V3. Accordingly, in the touch execution time section TA2, the common voltage VCOM is successfully set to the periodical pulse signal that transits between the third voltage V3 and the fourth voltage V4. In other words, the touch scanning operation may be executed quickly and stably in the touch execution time section TA2.

In this embodiment, the third voltage V3 may be equal to a reference ground voltage, i.e., the voltage of 0V.

On the other hand, when the touch execution time section TA2 ends, it means that the touch scanning operation has been completed, and the process is to enter the following display scanning time section DST2. In order to perform the following display scanning operation successfully, the common voltage generator 120 may provide the second voltage V2 in the touch end time section TA3 to lower the voltage value of the common voltage VCOM. Based on that the voltage value of the second voltage V2 is smaller than the voltage value of the fifth voltage V5, the common voltage VCOM is quickly lowered to be smaller than the fifth voltage V5 in the touch end time section TA3. Accordingly, the common voltage VCOM is stably set to be equal to the fifth voltage V5 after the touch end time section TA3 ends and before entering the following display scanning time section DST2, and the common voltage VCOM is provided stably in the display scanning time section DST2 to render stable image display quality.

Figure 3A:
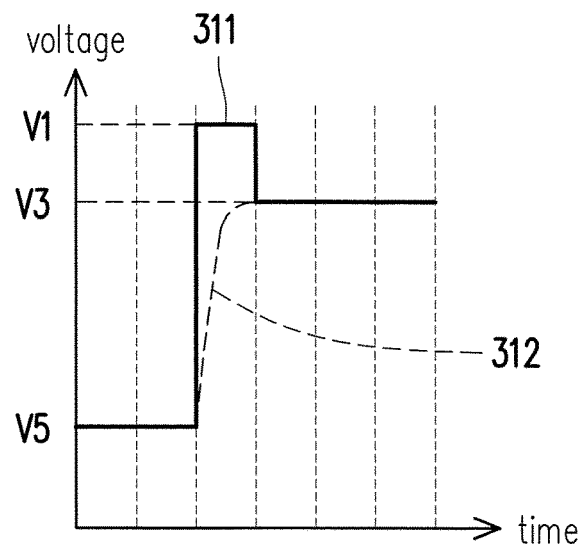
FIG. 3A and FIG. 3B are waveform diagrams respectively illustrating the common voltage in the touch start time section and the touch end time section according to the embodiment of the invention.
Figure 3B:
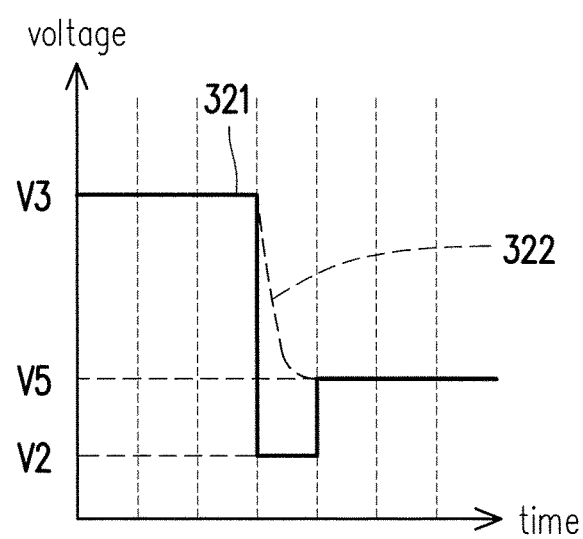

Hereinafter, referring to FIG. 3A and FIG. 3B, FIG. 3A and FIG. 3B are waveform diagrams respectively illustrating the common voltage in the touch start time section and the touch end time section according to the embodiment of the invention. In FIG. 3A, in the touch start time section, the common voltage generator 120 generates the common voltage VCOM based on a waveform 311, and based on the parasitic capacitance and resistance effect in the touch display panel, a waveform 312 is the waveform of the common voltage VCOM that is actually measured. It is known from FIG. 3A that, due to the relatively high first voltage V1, the voltage value of the common voltage VCOM is raised more quickly to the required voltage value (equal to the third voltage V3).

In FIG. 3B, in the touch end time section, the common voltage generator 120 generates the common voltage VCOM based on a waveform 321, and based on the parasitic capacitance and resistance effect in the touch display panel, a waveform 322 is the waveform of the common voltage VCOM that is actually measured. It is known from FIG. 3B that, due to the relatively low second voltage V2, the voltage value of the common voltage VCOM is lowered more quickly to the required voltage value (equal to the third voltage V5).

According to FIG. 3A and FIG. 3B, it is easy to notice that, when the in cell touch display device 100 of the embodiment of the invention enters the touch scanning time section TST1 from the display scanning time section DST1, or enters the display scanning time section DST2 from the touch scanning time section TST1, the common voltage VCOM is quickly set to the required voltage value and the settling time required for transition of the common voltage VCOM is reduced to effectively improve the efficiency of the in cell touch display device 100.

Figure 4:
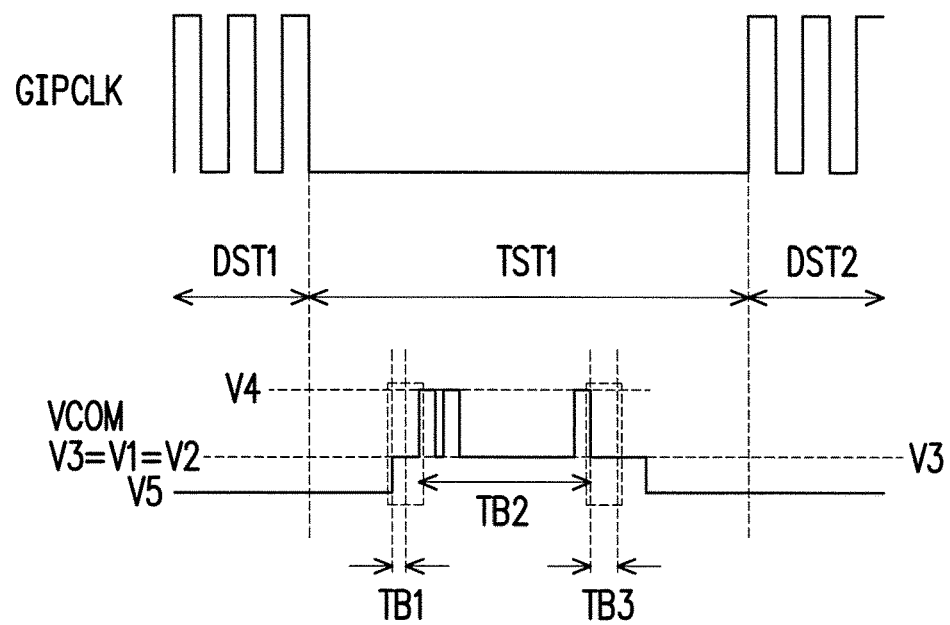
FIG. 4 is a waveform diagram of another embodiment of the common voltage generating method for the in cell touch display device of the embodiment of the invention.

Regarding details of implementation of another embodiment of the invention, please refer to FIG. 1 and FIG. 4, wherein FIG. 4 is a waveform diagram of another embodiment of the common voltage generating method for the in cell touch display device of the embodiment of the invention. First, the timing controller 110 divides a time section into a display scanning time section DST1 and a touch scanning time section TST1. In the display scanning time section DST1, the display scanning operation is performed according to a gate clock signal GIPCLK that transits continuously. Moreover, in the touch scanning time section TST1, the gate clock signal GIPCLK stops transiting and the display scanning operation is stopped. In the meantime, the in cell touch display device 100 performs the touch scanning operation for touch detection.

In addition, the timing controller 110 generates the control signal CTRL, so as to divide a touch start time section TB1, a touch execution time section TB2, and a touch end time section TB3 that sequentially take place in the touch scanning time section TST1. Moreover, according to the control signal CTRL, the common voltage generator 120 provides the first voltage V1 that is equal to the third voltage V3 in the touch start time section TB1 to raise the common voltage VCOM from the fifth voltage V5 to the third voltage V3, so as to quickly raise the voltage value of the common voltage VCOM and reduce the rise time required for the common voltage VCOM. Here, the first voltage V1 may be equal to the third voltage V3 to be the reference ground voltage. That is, the first voltage V1=the third voltage V3=0V. It should be noted that, in the touch start time section TB1, the common voltage generator 120 may directly connect a reference ground terminal that provides the reference ground voltage to the common voltage VCOM, and utilize the relatively large current drawability of the reference ground terminal to quickly lower the voltage value of the common voltage VCOM to 0V.

Then, in the touch execution time section TB2, the common voltage generator 120 makes the common voltage VCOM become a periodical pulse signal that transits between the third voltage V3 and the fourth voltage V4 according to the control signal CTRL. According to the periodical pulse on the common voltage VCOM in the touch execution time section TB2, a plurality of touch plates on the touch display panel may be scanned to complete an operation of touch point report.

Next, after the touch execution time section TB2 ends, the common voltage generator 120 provides the second voltage equal to 0V in the touch end time section TB3 according to the control signal CTRL to lower the common voltage VCOM from the fourth voltage V4 to the second voltage V2 and maintain it stably at the second voltage V2 (=0V). After the touch end time section TB3 ends, the common voltage VCOM recovers and becomes equal to the fifth voltage V5, and enters the following display scanning time section DST2.

Figure 5:
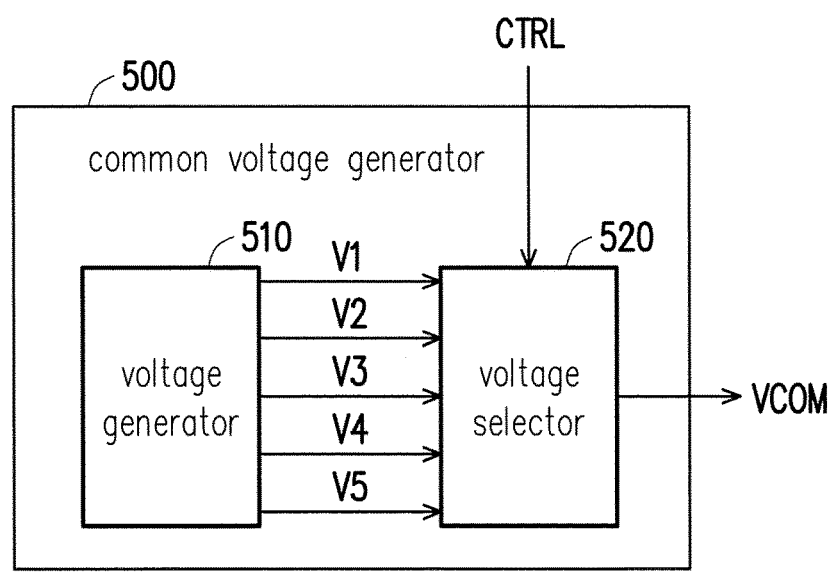
FIG. 5 is a schematic diagram of the common voltage generator according to an embodiment of the invention.

Referring to FIG. 5, FIG. 5 is a schematic diagram of the common voltage generator according to an embodiment of the invention. A common voltage generator 500 includes a voltage generator 510 and a voltage selector 520. The voltage generator 510 generates the first voltage V1, the second voltage V2, the third voltage V3, the fourth voltage V4, and the fifth voltage V5. The voltage selector 520 is coupled to the voltage generator 510. The voltage selector 520 receives the first voltage V1, the second voltage V2, the third voltage V3, the fourth voltage V4, the fifth voltage V5, and the control signal CTRL, and according to the control signal CTRL, selects one of the first voltage V1, the second voltage V2, the third voltage V3, the fourth voltage V4, and the fifth voltage V5 in different time sections to generate the common voltage VCOM.

In some embodiments of the invention, the voltage value of the fourth voltage V4 is greater than the voltage value of the first voltage V1, the voltage value of the first voltage V1 is greater than the voltage value of the third voltage V3, the voltage value of the third voltage V3 is greater than the voltage value of the fifth voltage V5, and the voltage value of the fifth voltage V5 is greater than the voltage value of the second voltage V2. In other embodiments, the voltage values of the first voltage V1, the second voltage V2, and the third voltage V3 are equal to the voltage value of the reference ground voltage (=0V).

Regarding the hardware architecture of the voltage generator 510, there is no specific limitation and it is possible to use a voltage generator that those skilled in the art are familiar with, e.g., a voltage regulator, a voltage boost converter, a voltage buck converter, a charge bump circuit, or a combination of the foregoing circuits.

Figure 6A:
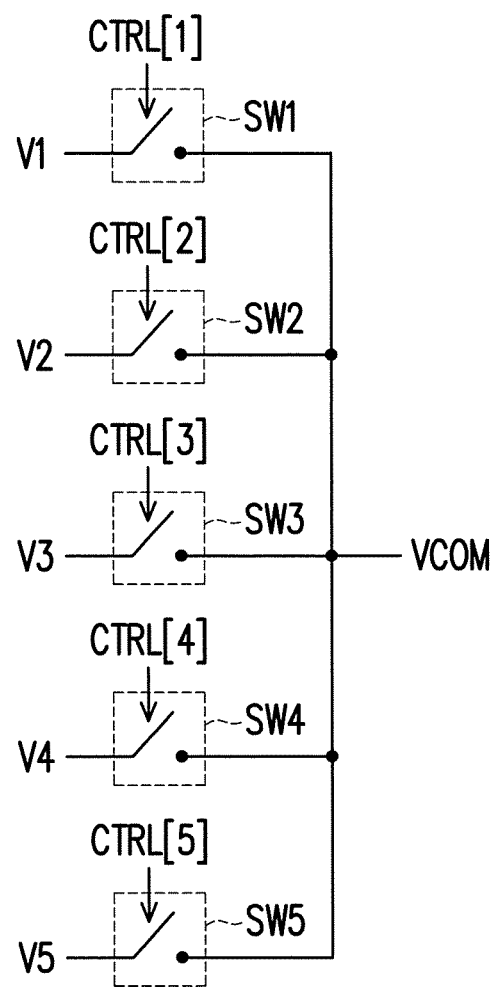
FIG. 6A, FIG. 6B, and FIG. 7 are schematic diagrams illustrating the voltage selector according to several embodiments of the invention.
Figure 6B:
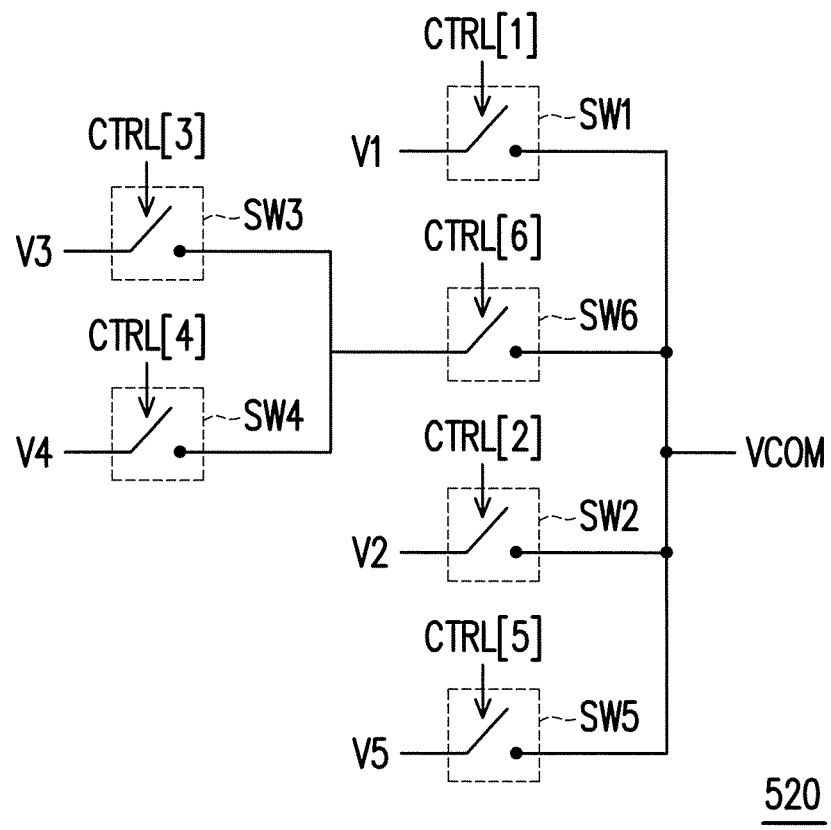
Figure 7:
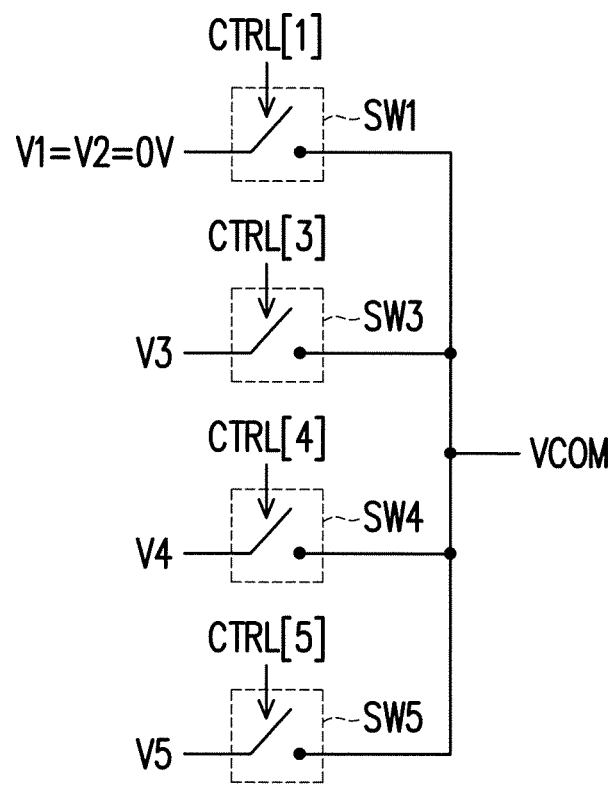

Regarding details of implementation of the voltage selector, FIG. 6A, FIG. 6B, and FIG. 7 are schematic diagrams illustrating the voltage selector according to several embodiments of the invention. In FIG. 6A, the voltage selector 520 includes switches SW1 to SW5, which respectively receive the first voltage V1 to the fifth voltage V5 to be turned on or off according to a plurality of bits CTRL[1] to CTRL[5] of the control signal respectively. The first voltage V1 to the fifth voltage V5 are provided respectively, so as to generate the common voltage VCOM. Any two of the switches SW1 to SW5 are not turned on at the same time.

For example, when the touch display device is in the display scanning time section, the switch SW5 is turned on (the switches SW1 to SW4 are turned off), and the voltage selector 520 provides the fifth voltage V5 to generate the common voltage VCOM. In the touch start time section, the switch SW1 is turned on (the switches SW2 to SW5 are turned off), and the voltage selector 520 provides the first voltage V1 to generate the common voltage VCOM. In the touch execution time section, the switches SW3 and SW4 are alternately turned on (the switches SW1, SW2, and SW5 are turned off), and the third voltage V3 and the fourth voltage V4 are alternately provided to generate the common voltage VCOM that is a periodical pulse signal. In the touch end time section, the switch SW2 is turned on (the switches SW1 and SW3 to SW5 are turned off), and the voltage selector 520 provides the second voltage V2 to generate the common voltage VCOM.

Furthermore, referring to FIG. 6B, an endpoint between the switches SW3 and SW4 for generating the common voltage VCOM may be further connected in series to a switch SW6. The switch SW6 is controlled by a bit CTRL[6] of the control signal, and the switch SW6 is turned on only in the touch execution time section for transmitting the periodical pulse signal generated according to the switches SW3 and SW4. Moreover, the switch SW6 is turned off in the other time sections.

In FIG. 7, the voltage selector 520 only includes the switches SW1, SW3, SW4, and SW5. The switch SW1 is for transmitting the first voltage V1 and the second voltage V2 which are equal to 0V, so as to generate the common voltage VCOM. The switch SW3 is for transmitting the third voltage V3 to generate the common voltage VCOM. The switches SW4 and SW5 respectively transmit the fourth voltage V4 and the fifth voltage V5 to generate the common voltage VCOM. The voltage selector 520 of FIG. 7 is for generating the waveform of the common voltage in the embodiment of FIG. 4. Details of the related operations have been specified in the embodiment of FIG. 4 and thus are not repeated hereinafter.

Figure 8:
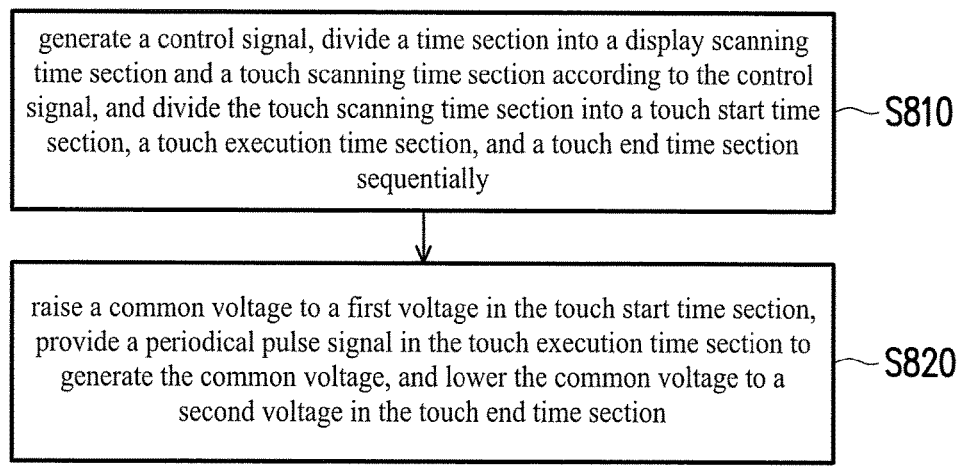
FIG. 8 is a flowchart illustrating the common voltage generating method according to an embodiment of the invention.

Hereinafter, referring to FIG. 8, FIG. 8 is a flowchart illustrating the common voltage generating method according to an embodiment of the invention. The flowchart of FIG. 8 is adapted for the in cell touch display device, wherein Step S810 is executed to: generate a control signal, divide a time section into a display scanning time section and a touch scanning time section according to the control signal, and divide the touch scanning time section into a touch start time section, a touch execution time section, and a touch end time section sequentially. Then, Step S820 is executed to: raise a common voltage to a first voltage in the touch start time section, provide a periodical pulse signal in the touch execution time section to generate the common voltage, and lower the common voltage to a second voltage in the touch end time section. The pulse signal oscillates between a third voltage and a fourth voltage. The first voltage is not smaller than the third voltage, the second voltage is not greater than the third voltage, and the third voltage is smaller than the fourth voltage.

Details of the above steps have been specified in the foregoing embodiments and examples and thus are not repeated hereinafter.

To sum up, according to the invention, the common voltage is generated by providing specific voltages in the touch start time section and the touch end time section, and the common voltage may be raised to the required voltage value quickly. Accordingly, the settling time for the common voltage is reduced, and the quality of touch detection is improved without compromising the display quality.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An in cell touch display device, comprising:
   a timing controller generating a control signal, dividing a time section into a display scanning time section and a touch scanning time section according to the control signal, and dividing the touch scanning time section into a touch start time section, a touch execution time section, and a touch end time section sequentially; and
   a common voltage generator raising a common voltage to a first voltage in the touch start time section, providing a pulse signal that is periodical in the touch execution time section to generate the common voltage, and lowering the common voltage to a second voltage in the touch end time section,
   wherein the pulse signal oscillates between a third voltage and a fourth voltage, the first voltage is not smaller than the third voltage and smaller than the fourth voltage, the second voltage is not greater than the third voltage, and the third voltage is smaller than the fourth voltage.

2. The in cell touch display device according to claim 1, wherein the common voltage generator further makes the common voltage equal to a fifth voltage in the display scanning time section, wherein the fifth voltage is smaller than the third voltage.

3. The in cell touch display device according to claim 2, wherein the common voltage generator comprises:
   a voltage generator generating the first voltage, the second voltage, the third voltage, the fourth voltage, and the fifth voltage; and
   a voltage selector coupled to the voltage generator, and receiving the control signal and providing one of the first voltage, the second voltage, the third voltage, the fourth voltage, and the fifth voltage according to the control signal to generate the common voltage.

4. The in cell touch display device according to claim 3, wherein the voltage generator generates the first voltage that is greater than the third voltage, and the voltage selector provides the first voltage in the touch start time section to generate the common voltage and raises a voltage value of the common voltage from the fifth voltage to the first voltage.

5. The in cell touch display device according to claim 4, wherein the voltage generator generates the second voltage that is smaller than the fifth voltage, and the voltage selector provides the second voltage in the touch end time section to generate the common voltage and lowers the voltage value of the common voltage from the third voltage to the second voltage.

6. The in cell touch display device according to claim 3, wherein the voltage generator provides a reference ground voltage to generate the first voltage, and the voltage selector directly provides the reference ground voltage in the touch start time section to generate the common voltage and raises a voltage value of the common voltage from the fifth voltage to the reference ground voltage.

7. The in cell touch display device according to claim 6, wherein the voltage generator provides the reference ground voltage to generate the second voltage, and the voltage selector directly provides the reference ground voltage in the touch end time section to generate the common voltage and lowers the voltage value of the common voltage from the fourth voltage to the reference ground voltage.

8. The in cell touch display device according to claim 3, wherein the voltage selector comprises:
   a first switch receiving the first voltage and the control signal and providing the first voltage according to the control signal to generate the common voltage;
   a second switch receiving the second voltage and the control signal and providing the second voltage according to the control signal to generate the common voltage;
   a third switch receiving the third voltage and the control signal and providing the third voltage according to the control signal to generate the common voltage;
   a fourth switch receiving the fourth voltage and the control signal and providing the fourth voltage according to the control signal to generate the common voltage; and
   a fifth switch receiving the fifth voltage and the control signal and providing the fifth voltage according to the control signal to generate the common voltage.

9. The in cell touch display device according to claim 8, wherein any two of the first switch to the fifth switch are not turned on at the same time.

10. The in cell touch display device according to claim 9, wherein the first switch is turned on in the touch start time section, the second switch is turned on in the touch end time section, the third switch and the fourth switch are alternately turned on in the touch execution time section, and the fifth switch is turned on in the display scanning time section.

11. The in cell touch display device according to claim 3, wherein the voltage selector comprises:
 a first switch receiving a reference ground voltage and the control signal and providing the reference ground voltage according to the control signal to generate the common voltage;
 a second switch receiving the third voltage and the control signal and providing the third voltage according to the control signal to generate the common voltage;
 a third switch receiving the fourth voltage and the control signal and providing the fourth voltage according to the control signal to generate the common voltage; and
 a fourth switch receiving the fifth voltage and the control signal and providing the fifth voltage according to the control signal to generate the common voltage.

12. The in cell touch display device according to claim 11, wherein the first switch is turned on in the touch start time section and the touch end time section, the second switch and the third switch are alternately turned on in the touch execution time section, and the fourth switch is turned on in the display scanning time section.

13. A common voltage generating method adapted for an in cell touch display device, the common voltage generating method comprising:
 generating a control signal, dividing a time section into a display scanning time section and a touch scanning time section according to the control signal, and dividing the touch scanning time section into a touch start time section, a touch execution time section, and a touch end time section sequentially; and
 raising a common voltage to a first voltage in the touch start time section, providing a pulse signal that is periodical in the touch execution time section to generate the common voltage, and lowering the common voltage to a second voltage in the touch end time section,
 wherein the pulse signal oscillates between a third voltage and a fourth voltage, the first voltage is not smaller than the third voltage and smaller than the fourth voltage, the second voltage is not greater than the third voltage, and the third voltage is smaller than the fourth voltage.

14. The common voltage generating method according to claim 13, further comprising:
 providing a fifth voltage in the display scanning time section to generate the common voltage, wherein the fifth voltage is smaller than the third voltage.

15. The common voltage generating method according to claim 14, wherein raising the common voltage to the first voltage in the touch start time section comprises:
 generating the first voltage that is greater than the third voltage; and
 providing the first voltage in the touch start time section to generate the common voltage, and raising a voltage value of the common voltage from the fifth voltage to the first voltage.

16. The common voltage generating method according to claim 15, wherein lowering the common voltage to the second voltage in the touch end time section comprises:
 generating the second voltage that is smaller than the fifth voltage; and
 providing the second voltage in the touch end time section to generate the common voltage, and lowering the voltage value of the common voltage from the third voltage to the second voltage.

17. The common voltage generating method according to claim 14, wherein raising the common voltage to the first voltage in the touch start time section comprises:
 providing a reference ground voltage to generate the first voltage; and
 directly providing the reference ground voltage in the touch start time section to generate the common voltage, and raising the voltage value of the common voltage from the fifth voltage to the reference ground voltage.

18. The common voltage generating method according to claim 17, wherein lowering the common voltage to the second voltage in the touch end time section comprises:
 providing the reference ground voltage to generate the second voltage; and
 directly providing the reference ground voltage in the touch end time section to generate the common voltage, and lowering the voltage value of the common voltage from the third voltage to the reference ground voltage.

* * * * *